Dec. 16, 1930.  E. DALAND  1,785,339
SHOCK ABSORBER FOR LANDING GEARS OF AIRPLANES
Filed Aug. 20, 1928

Inventor
Elliot Daland
By Robert H. Young
Attorney

Patented Dec. 16, 1930

1,785,339

UNITED STATES PATENT OFFICE

ELLIOT DALAND, OF TORRESDALE, PENNSYLVANIA, ASSIGNOR TO KEYSTONE AIRCRAFT CORPORATION, OF BRISTOL, PENNSYLVANIA, A CORPORATION OF DELAWARE

SHOCK ABSORBER FOR LANDING GEARS OF AIRPLANES

Application filed August 20, 1928. Serial No. 300,875.

This invention relates to landing gear for airplanes, but more particularly to shock absorbers therefor, and the invention has for its object to provide improvements in the construction of these devices whereby great strength is combined with simplicity and light weight.

A further object of the invention is to provide a construction whereby the resiliency of the shock absorber propressively diminishes as the movement of the piston increases progressively in such manner that the device, while freely responsive to slight shocks, properly resists the application of heavy shocks without excessive movement and rebound.

These objects are accomplished by a construction free of complication, and by an arrangement of parts resulting in a compact unit which is strong, durable and efficient.

Referring to the accompanying drawings.

Figure 1:
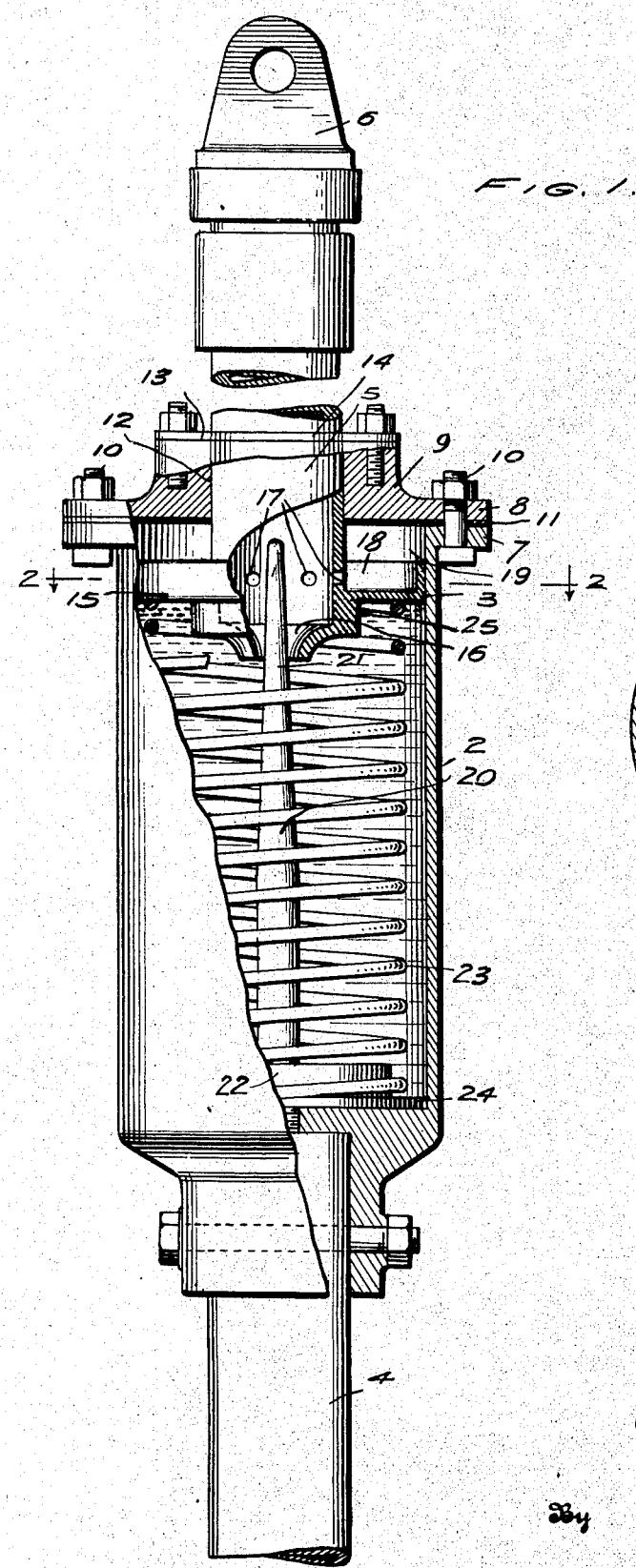
Figure 1 is an elevation of the shock absorber partly in vertical section.
Figure 2:
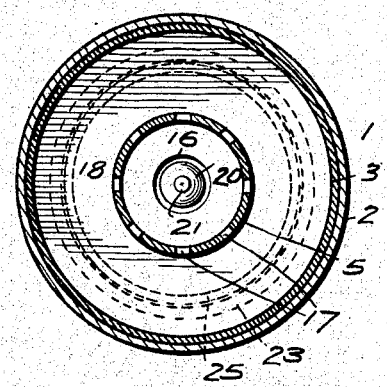
Figure 2 is a transverse sectional view taken on line 2—2 of Figure 1.

Like numerals of reference indicate the same parts throughout the several figures, in which 1 indicates the device which includes the cylinder 2 and piston 3.

The cylinder 2 receives the tube 4 which leads to the wheel and axle mounting of the landing gear, while the piston 2 has a piston-rod 5 carrying a fixture 6 for connection to the structure of the airplane.

The top of the cylinder 2 is suitably flanged at 7 to receive the flange 8 of the piston-head 9, which flanges 7 and 8 are removably secured together as by bolts 10 clamping a suitable packing 11 disposed between the said flanges to provide a pressure tight joint.

The cylinder-head 9 is provided with a bore 12 through which the piston-rod 5 extends, and said head is faced at 13 to receive a packing gland 14 by which the piston-rod 5 may be suitably packed in the usual manner.

Referring particularly to the piston 3, it will be seen that the same embodies a flat piston-head 15 having a central bell shaped opening 16, and it will be seen that the wall of the piston-rod 5 directly above the piston-head is provided with a plurality of small openings or ports 17 which communicate with a chamber 18 which is open to that portion 19 of the cylinder which is above the piston 3, so that communication between the contents of the cylinder on both sides of the piston 15 is at all times established and maintained.

Referring particularly to the cylinder 2, it will be seen that it accommodates therein, a tapered metering pin 20 having its upper end 21 lying within the central bell shaped opening 16 in the piston-head 15, while the lower end of the tapered metering pin 20 provides an enlargement 22 to receive and center the large spiral spring 23 on the lower head 24 of the cylinder 2. A spring centering boss 25 is provided on the piston-head 15 to receive the upper end of the spring 23, as shown in the drawing.

Having thus described the several parts of the invention its operation is as follows:

The parts being assembled as shown and described, and the cylinder 2 having been filled with a suitable fluid such as oil, the spring 23 is of such capacity as to sustain the load of the airplane and maintain the piston 3 in an intermediate position within the cylinder. Upon the application of an upward thrust on the tube 4 and cylinder 2 as in landing the airplane, the piston 3 compresses the spring 23 and moves inwardly of the cylinder 2. This movement of the piston displaces the fluid within the cylinder 2 through the central bell shaped opening 16 in the piston-head 15 around the tapered end 21 of the tapered metering pin 20, and causes said fluid to pass through the small openings or ports 17 into the cylinder space 19 above the piston 3. Upon the rebound of the piston, the fluid reverses its flow to establish its normal position, but as freedom of this flow is restricted by the size of the ports 17, the speed of the rebound is suitably checked. In this manner the desired resiliency is obtained under the influence of light shocks.

It is characteristic of this structure that the piston 3 is imperforate except for the central bell shaped opening 16, the effective area of which is always under the control of the metering pin. The result of this construction is that the fluid cannot pass from one side of the piston to the other side any more freely in one direction than in the other, except as the flow is gradually retarded by the tapered metering pin 20 as the piston moves inwardly of the cylinder, and gradually facilitated by the metering pin 20 as the piston moves outwardly of the cylinder. The effect of this is that there is never any sudden outward movement of the piston 3 when the inward movement is checked.

When, however, the shocks is excessive and the spring 23 is subjected to a load which would impart excessive movement of the piston within the cylinder, the displacement of the fluid from under the piston is automatically and progressively restricted as the movement of the piston progresses. This is accomplished by the action of the tapered metering pin 20, for as the piston passes down over the metering pin, the cross sectional area of the metering pin increases as the movement of the piston progresses, and the bell shaped opening through the piston-head around the metering pin 20 consequently diminishes progressively. The rate of the displacement of the fluid through the piston is progressively diminished, and the movement of the piston is progressively checked. Were it not for the small ports 17, the rebound of the piston under these conditions would be violent, as on the reverse movement of the same, the area of the opening in the piston-head would be progressively increasing and the resistance diminishing which would tend to accellerate the speed of the rebound. But the small ports 17 prevent such result. The area of said ports are fixed and therefore restrict too rapid displacement of the fluid from above the piston on its rebound movement.

I prefer to shape the orifice 16 substantially as an inverted bell so as to contract the oil stream in an upward direction or when the piston is moving under the influence of shock, and to insure an easier but not a sudden flow of oil in the reverse direction when the piston is rebounding so as to effect a sufficiently quick but not a sudden recovery.

It will then be seen that the inventive purpose of the device is accomplished in a particularly simple and effective manner, and without complication of parts, but by the use of an assembly which is robust and durable and free from likelihood of breakage or derangement.

Having fully described the invention, it is to be understood that the same is not to be limited to the exact construction shown in the drawing and herein described, as the same is susceptible to changes in the construction and arrangement of parts, and it is considered that the invention clearly embraces all of such changes and modifications as fall within the limit and scope of the appended claims.

What is claimed as new and is desired to be secured by Letters Patent of the United States is:

1. A device of the character described including a cylinder and a piston, the former including a element for connection to the wheel and axle mounting of an airplane, the piston including a piston rod for connection to an airplane structure, the said piston being restricted to a central opening in its head and having a plurality of small ports above the piston head, and having a chamber communicating with said small ports and open to the cylinder above the piston to establish and maintain communication between the contents of the cylinder on both sides of the piston at all times, a tapered metering pin within the said cylinder, having its upper end extending through the said central opening in the piston head to provide a space around the tapered stud to control displacement of a fluid through piston head upon movement of the piston in the cylinder in either direction, and a spring within the cylinder and under the piston to normally hold the piston in operative position, the whole arranged whereby upon inward movement of the piston in the cylinder and along the tapered metering pin, the displacement of fluid below the piston head is progressively restricted by the progressively diminishing area of the space in the piston-head around the tapered metering pin and upon outward movement of the piston in the cylinder, a rapid displacement of the fluid from above the piston is restricted by the said small ports above the piston.

2. A device of the character described including a cylinder and a piston and means for connection with the landing gear of an airplane, the piston including a piston rod and being restricted to a central opening in its head and a plurality of small ports above the piston head and having a chamber communicating with said small ports and opening to the cylinder above the piston to establish and maintain communication between the contents of the cylinder on both sides of the piston at all times, a tapered metering pin within the said cylinder having its upper end extending through the said central opening in the piston-head to provide a space around the tapered metering pin to control displacement of a fluid through said piston-head upon movement of the piston in the cylinder in either direction, and a spring within the cylinder and under the piston to normally hold the piston in operative position, the whole arranged whereby upon inward movement of the piston in the cylinder and along the tapered metering pin, the displacement of the fluid below the piston-head is progressively restricted by progressively diminishing area of the space in the piston-head around the tapered metering pin, and upon outward movement of the piston in the cylinder, a rapid displacement of the fluid from above the piston is restricted by the said small ports above the piston.

3. A device of the character described including a cylinder and a piston, the latter including a piston-rod and being restricted to a central opening in its head and a plurality of small ports above the piston head communicating with the cylinder above the piston to establish and maintain communication between the contents of the cylinder on both sides of the piston at all times, a tapered metering pin within the cylinder having its upper end extending through the said central opening in the piston-head to provide a space around the tapered metering pin to control displacement of fluid through said piston head upon movement of the piston in the cylinder in either direction, and a spring within the cylinder and under the piston to normally hold the piston in operative position, the whole arranged for operation as specified in claim 2.

4. A device of the character described including a cylinder and a piston, the latter including a piston-rod restricted to a single central opening in its head to permit displacement of a fluid therethrough and having means above the piston for assisting in restricting the displacement of a fluid through the piston to establish and maintain communication between the contents of the cylinder on both sides of the piston at all times, a tapered metering pin within the cylinder having its upper end extending through the said opening in the piston-head to provide a space around the tapered metering pin, the whole arranged in such manner that upon inward movement of the piston in the cylinder, the displacement of the fluid below the piston head is progressively restricted by the progressively diminishing area of the space in the piston head around the tapered metering pin to control displacement of fluid through the piston head in either direction and upon outward movement of the piston in the cylinder, a rapid displacement of the fluid from above the piston is restricted by the said displacement restricting means above the piston.

In testimony whereof I affix my signature.

ELLIOT DALAND.